(12) United States Patent
Coman (10) Patent No.: US 7,861,271 B2
(45) Date of Patent: Dec. 28, 2010

(54) BASEBAND VIDEO SIGNALING FOR SET-TOP BOX LOCAL LOOP CONNECTION

(75) Inventor: Ion Coman, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1799 days.

(21) Appl. No.: 10/729,050

(22) Filed: Dec. 5, 2003

(65) Prior Publication Data

US 2005/0125839 A1 Jun. 9, 2005

(51) Int. Cl.
*H04N 7/20* (2006.01)
(52) U.S. Cl. .......................... 725/71; 725/78; 725/114; 725/115; 725/116; 725/127; 375/240.26; 375/257; 340/725
(58) Field of Classification Search ............... 725/71, 725/78, 114–116, 127; 375/240.26, 257; 348/725
See application file for complete search history.

(56) References Cited

U.S. PATENT DOCUMENTS

| | | | |
|---|---|---|---|
| 6,490,727 B1 * | 12/2002 | Nazarathy et al. ........... 725/129 |
| 2003/0140351 A1 * | 7/2003 | Hoarty et al. ............... 725/132 |
| 2003/0145331 A1 * | 7/2003 | Escobar et al. .............. 725/110 |
| 2004/0181800 A1 * | 9/2004 | Rakib et al. ................... 725/25 |
| 2004/0252243 A1 * | 12/2004 | Stewart ....................... 348/725 |
| 2005/0135614 A1 * | 6/2005 | Hollar et al. ................. 380/201 |
| 2006/0271966 A1 * | 11/2006 | Staal et al. .................... 725/68 |

* cited by examiner

*Primary Examiner*—Christopher Kelley
*Assistant Examiner*—Charles N Hicks
(74) *Attorney, Agent, or Firm*—Christopher P. Maiorana, PC (57) ABSTRACT

An apparatus comprising a transmodulator unit. The transmodulator unit generally comprises (i) a first input configured to receive a baseband video signal, (ii) a second input configured to receive a first encoded data signal and (iii) an output configured to present a second encoded data signal. The second encoded data signal is generated in response to the first encoded data signal and the baseband video signal. The first encoded data signal comprises an advanced data signal. The second encoded data signal comprises a legacy data signal.

22 Claims, 5 Drawing Sheets

FIG. 5

BASEBAND VIDEO SIGNALING FOR SET-TOP BOX LOCAL LOOP CONNECTION

CROSS REFERENCE TO RELATED APPLICATIONS

The present application may relate to co-pending application Ser. No. 10/448,752 filed May 30, 2003, which is hereby incorporated by reference in its entirety.

FIELD OF THE INVENTION

The present invention relates to design architecture for set-top boxes generally and, more particularly, to baseband video signaling for set-top box local loop connection.

BACKGROUND OF THE INVENTION

Conventional set-top boxes already deployed in the field comply with some type of modulation and error correction standards. As new modulation and coding schemes are being introduced, backward compatibility in the transmitted signal cannot be preserved at all times. Incompatibility often forces service operators to swap out large numbers of set-top boxes in order to allow the users to receive the new signal format. Such swap outs are costly and undesirable.

Some conventional approaches to set-top box compatibility implement backwards-compatible modulation, such as hierarchical modulation. One such approach has been proposed DVB-S2 for satellite transmission. However, backwards compatibility is only a partial solution to the problem and can have additional drawbacks. In particular, the DVB proposal provides sub-optimal data transmission since some loss is introduced. The additional loss has resulted in other operators avoiding the implementation of the proposal.

It would be desirable to implement a transmodulator that may be installed in the signal path before the set-top box to convert an advanced data signal to a legacy data signal for set-top boxes that are not compliant with the advanced data signal. It would also be desirable to implement baseband video signaling for a set-top box local loop connection to provide continuous communication with the transmodulator unit.

SUMMARY OF THE INVENTION

The present invention concerns an apparatus comprising a transmodulator unit. The transmodulator unit generally comprises (i) a first input configured to receive a baseband video signal, (ii) a second input configured to receive a first encoded data signal and (iii) an output configured to present a second encoded data signal. The second encoded data signal is generated in response to the first encoded data signal and the baseband video signal. The first encoded data signal comprises an advanced data signal. The second encoded data signal comprises a legacy data signal.

The objects, features and advantages of the present invention include providing baseband video signaling for a set-top box local loop connection that may (i) implement a continuous one-way communication channel; (ii) enable real time data transfers; (iii) communicate programming information from a legacy set-top box to an auxiliary unit; (iv) route baseband video signal from a set-top box through auxiliary unit; (v) encode information in the vertical blanking interval of a video signal; (vi) provide a transmodulator unit configured to decode messages embedded in the vertical blanking interval; (vii) operate at a rate defined by the vertical blanking interval and/or (viii) not affect the properties of the displayed video signal.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention may enable legacy receivers (or set-top boxes) already deployed in the field to continuously communicate with auxiliary units (e.g., a transmodulator unit, etc.) for providing compatibility with advanced modulation/FEC signals (e.g., 8PSK and Turbo Coded signal, a Low Density Parity Check (LDPC), etc.) when the receiver is not compliant with the advanced signal. The present invention may be implemented between an auxiliary unit (e.g., a satellite signal transmodulator) and a set top box to provide a continuous communication channel for programming the auxiliary unit. The present invention may provide one or more of the following (i) a conversion from one format (e.g., 8PSK/16QAM+TC signals or LDPC signals) to another format (e.g., QPSK DVB-S signals), (ii) implement a radio frequency (RF) loop through bypass of the module for operation in one implementation of a legacy mode, and (iii) pass LNB supply current from a set-top box (STB) to a dish antenna. The legacy mode may provide low power consumption since the transmodulator can be put on standby or sleep. Another option for the legacy mode may be to have the transmodulator configured for a transparent mode (e.g., demodulation and modulation of the same data format). The present invention may also (i) be implemented at a low cost, (ii) be implemented with a small form factor, (iii) provide easy installation, (iv) have low power consumption, (v) support DVB-S2 to DVB-S conversion and/or (vi) be implemented as a single integrated circuit.

The main functions of the transmodulator of the present invention may be implemented by using existing technology. However, functions such as MPEG null packet loading are not available with standard products used in the set-top box (STB) industry. The transmodulator may be implemented anywhere in the signal chain before the set-top box. In one example, the transmodulator may be implemented indoors in the vicinity of the STB. In another example, the transmodulator may be implemented outdoors in the vicinity of the receiving dish antenna.

Figure 1:
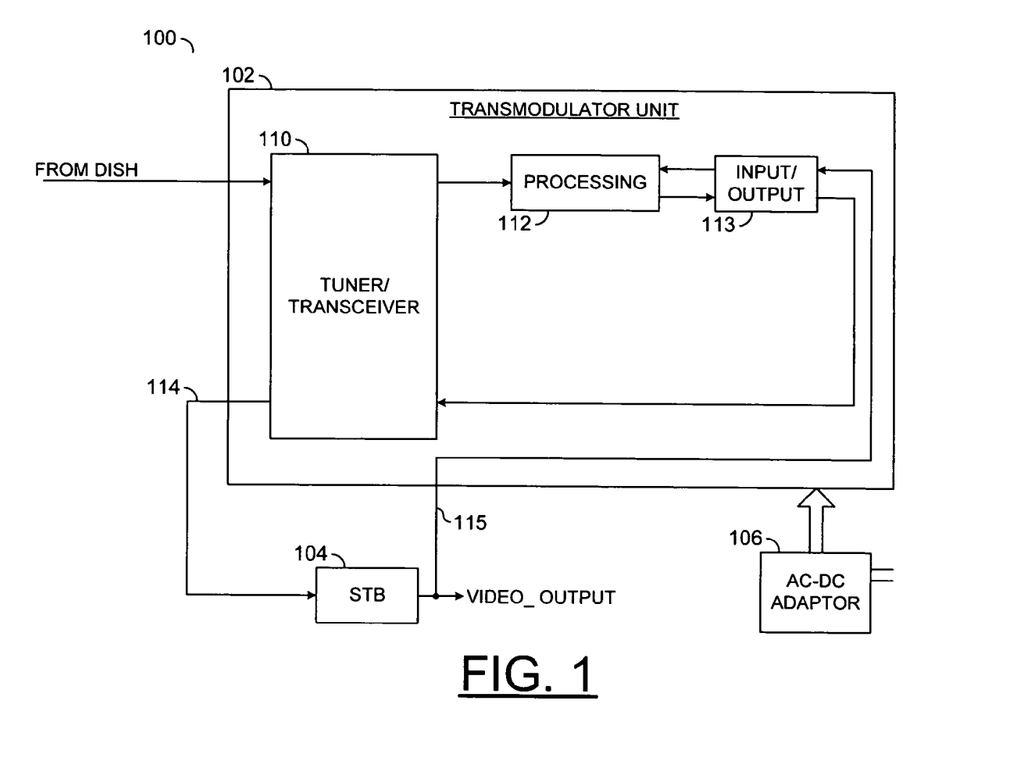
FIG. 1 is a block diagram of a transmodulator system in accordance with a preferred embodiment of the present invention.

Referring to FIG. 1, a block diagram of a system 100 is shown. The system 100 generally comprises an auxiliary unit (or circuit) 102 and a set-top box (STB) 104. In one example, the auxiliary unit 102 may be implemented as a transmodulator unit. A power supply 106 may present power to the circuit 102. The circuit 102 may receive an encoded signal (e.g., FROM_DISH). The STB 104 may generate a signal (e.g., VIDEO_OUTPUT). The signal VIDEO_OUTPUT may comprise a baseband video signal that may be presented to (i) the circuit 102 and (ii) a monitor or other video device or appliance (e.g., television, VCR, DVD recorder, etc.). The signal VIDEO_OUTPUT may be presented in one or more video formats (e.g., composite, S-video, component, RGB, AND, NTSC, PAL, SECAM, etc.). In a minimal cost environment, a composite signal may be preferred. In one example, the power supply 106 may be implemented as an AC-DC adaptor. However, other power sources may be implemented to meet the design criteria of a particular implementation. In another example, a power supply may be received from the 13v/18v supply in the low noise block (LNB) of a dish.

The circuit 102 may be implemented using a single integrated circuit or a number of integrated circuits that operate from the same external power supply 106 or from power received from the set-top box 104. Regardless of the level of integration and partitioning the following functions are generally implemented (i) a receiver/tuner and (ii) a transmitter/modulator. The receiver/tuner and the transmitter/modulator may be implemented as a single integrated circuit or a number of integrated circuits.

The circuit 102 generally comprise an input section (or circuit) 110, a demodulation/modulation (or processing) section (or circuit) 112 and an input/output section (or circuit) 113. The input section 110 may be implemented as a radio frequency (RF) transceiver (to be described in detail in connection with FIG. 3) or a tuner (to be described in detail in connection with FIG. 4). The processing circuit 112 may be implemented as a transmodulator circuit. The input/output circuit 113 may be implemented as a conversion circuit. For example, the input/output circuit 113 may be configured to convert input and output signals between analog and digital formats. The input/output circuit 113 may be configured to receive information from the STB 104 directly and present information to the STB 104 through (via) the input section 110.

Communication between the STB 104 and the transmodulator unit 102 may be implemented through a first feeder (e.g., a coaxial cable) 114 and a second feeder 115. The cables 114 and 115 may allow programming of the transmodulator unit 102. Such communication may also be used to read back information used by a CPU (not shown) in the STB 104. The communication protocol implemented is generally compatible with existing signaling since the circuit 102 is generally designed to operate with legacy receivers. In a satellite implementation, the use of a 22 kHz tone (sometimes referred to as a DiSEqC compliant tone) is generally possible. The 22 kHz tone is normally available between the STB 104 and the low noise block (LNB) of the dish antenna. Low speed, temporary data transfer may be achieved by using signaling schemes involving the 22 kHz tone, toggling the 13-18V LNB supply, etc. However, such schemes may be limited to times when the STB 104 is not in use (e.g., when a user is not watching television, during channel changes, etc.).

The present invention may implement a second, one-way communication channel by splitting the signal VIDEO_OUTPUT and routing the baseband video signal from the STB 104 to the circuit 102. Dedicated signal components (e.g., the vertical blanking interval (VBI), etc.) may be encoded in the STB 104 in such a way that the properties of the displayed video signal are not affected. The encoding and embedding described may be present in legacy set-top boxes. Such encoding schemes are currently implemented in MPEG (digital video) decoder IC, such as those in the SC2000 family from LSI Logic. Such encoding schemes are used for supporting applications such as teletext, cc, etc. In one example, the close caption (cc) line may be modified to provide the one-way communication channel to the circuit 102. For example, the circuit 102 may be configured to decode messages embedded in the VBI of the signal VIDEO_OUTPUT.

The functions of the circuit 102 may be programmed during vertical blanking interval (VBI) slots in the video signal VIDEO_OUTPUT of STB 104. In such an implementation, the signal VIDEO_OUTPUT may be looped through the circuit 102. The programming of the circuit 102 may occur at the rate of the VBI. While the rate of communication based on the signal VIDEO_OUTPUT may be low, the advantage of the method is that a continuous channel is generally provided. Also, such an implementation may be useful in applications where the STB 104 needs to write to the circuit 102 while (e.g., simultaneously with) providing service. For example, basing communication on the signal VIDEO_OUTPUT may avoid possible interference that may be associated with the 22 KHz tone signaling. Such an implementation may also be useful when a read back is done via null packets. The present invention may provide a continuous, one-way channel that enables real time data transfers. While the present invention may be implemented as a discrete device, an integrated solution may reduce cost, size and/or power.

Figure 2:
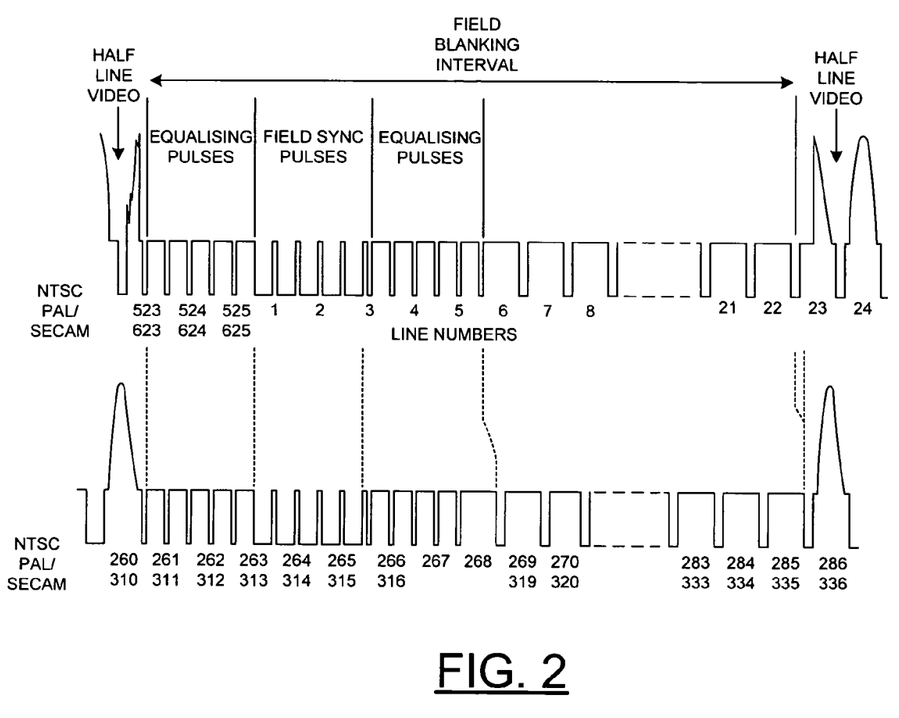
FIG. 2 is a timing diagram of a vertical blanking interval.

Referring to FIG. 2, a timing diagram illustrating a baseband video signal is shown. In one example, the signal VIDEO_OUTPUT may comprise an interlaced video signal comprising a number of frames where each frame has a first (or top) field (e.g., the top signal of FIG. 2) and a second (or bottom) field (e.g., the bottom signal of FIG. 2). In another example, the signal VIDEO_OUTPUT may comprise a progressive scan video signal comprising a number of complete frames.

When the signal VIDEO_OUTPUT comprises an interlaced signal, each of the fields may comprise a number of unused scan lines that may be available for use as a one-way communication channel between the STB 104 and the auxiliary unit 102. For example, unused scan lines may be part of an overscan region or a blanking interval. In one example, lines 6-22 in the first field and lines 269-285 (e.g., for NTSC format video) or lines 319-335 (e.g., for PAL/SECAM format video) may be available for embedding programming information to be transmitted from the STB 104 to the auxiliary unit 102. When the signal VIDEO_OUTPUT comprises a progressive scan signal, a similar number of lines (e.g., the combined number for both fields) may be available in each frame. The programming information may be encoded, for example, similarly to closed caption information or teletext pages. However, other encoding and/or embedding schemes may be implemented accordingly to meet the design criteria of a particular implementation.

Figure 3:
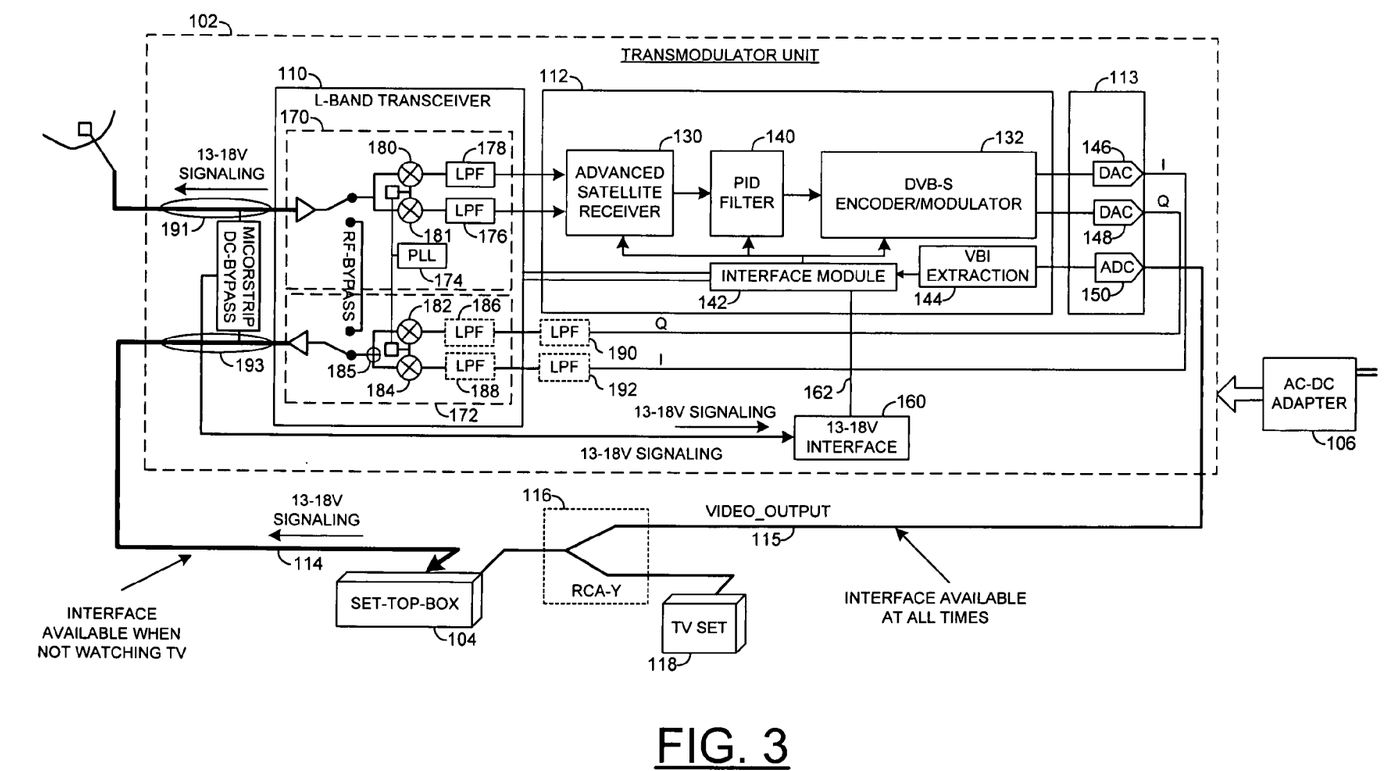
FIG. 3 is a more detailed diagram of another embodiment of the system of FIG. 1.

Referring to FIG. 3, a more detailed diagram of the transmodulator circuit 102 is shown. An output of the STB 104 may be coupled via a splitter (e.g., an RCA-Y) 116 to the feeder 115 and a video device 118 (e.g., a TV set). In one example, the circuit 110 may be implemented as a transceiver circuit. The processing section 112 may comprise a block (or circuit) 130, a block (or circuit) 132, a PID filter section (or circuit) 140, an interface module (or circuit) 142 and an extraction block (or circuit) 144. The input/output section 113 generally comprises a conversion circuit 146, a conversion circuit 148, and a conversion circuit 150. The extraction circuit 144 may be implemented, in one example, as a VBI extraction circuit. The conversion circuits 146 and 148 may be implemented as digital to analog (D/A) conversion circuits (also referred to as DACs). The conversion circuit 150 may be implemented as an analog to digital (A/D) conversion circuit.

A control interface 160 may communicate with the interface module 142 over a control line 162. The control interface 160 may be configured to use the DC (13-18V) supply modulated with the 22 kHz tone from the LNB. The circuit 144 may be configured to decode embedded information encoded similarly to closed captioning (CC) or teletext using VBI slots or Chroma on the baseband video signal VIDEO_OUTPUT. The embedded information may comprise messages for programming the transmodulator unit 102 during operation of the STB 104.

In one example, the transceiver 110 may be implemented as an L-band transceiver. The transceiver 110 may comprise a receiver (or tuner) block (or circuit) 170 and a transmitter block (or circuit) 172. The tuner 170 generally comprises a phase locked loop (PLL) 174, a filter block (or circuit) 176, a filter block (or circuit) 178, a mixer block (or circuit) 180 and a mixer block (or circuit) 181. A node (e.g., RF_BYPASS) may be connected between the tuner 170 and the transmit block 172. The transmitter block 172 generally comprises a mixer block (or circuit) 182, a mixer block (or circuit) 184, a filter block (or circuit) 186, a filter block (or circuit) 188 and a summing block (or circuit) 185. A filter block (or circuit) 190 may be coupled between the output of the DAC 148 and the filter 186. A filter block (or circuit) 192 may be coupled between the output of the DAC 146 and the filter 188. The filters 176, 178, 186, 188, 190 and 192 may be implemented as low pass filters.

The circuit 140 may provide program filtering by implementing a PID filter. The circuit 140 may be controlled through a control interface. The output circuit 113 may present quadrature signals (e.g., I and Q) from the DACS 146 and 148 for a Zero-IF RF Modulation implementation. A direct RF from V-DAC (harmonic) may be implemented.

The signal VIDEO_OUTPUT to the input/output section 113 is generally available from the STB 104 at all times. A signal (or interface) via the feeder 114 (e.g., from the input section 110 or 110') may only be available when the STB 104 is not used for watching a program. The input/output section 113 may be implemented with a single DAC or with two or more DACs.

The processing section 112 may be implemented, in one example, as a transmodulator integrated circuit. The receiver 130 may be implemented as a satellite receiver. The processing section 112 may be used to reduce throughput needed for 20 MSps (or 27.5 MSp; 22.0 Msp, etc.) transmission to the STB 104. The processing section 112 may be configured to present a direct IF (e.g., with a single DAC) or the signals I and Q (e.g., via the pair of DACs 146 and 148). Typically, a 6-8 bit converter may be implemented for the signals I/Q and a converter with approximately 10-bits may be implemented for an IF output. Communication is generally maintained with the STB 104 via VBI and MPEG layer signaling or via the 22 KHz modulation on the LNB supply. The power consumption of the circuit 112 may be in the range of 0.5-1.5 W.

In the case of a satellite STB 104, the tuner 120 may be implemented with zero-IF (e.g., direct conversion) that may allow sharing of the PLL 174 with the Tx modulator 172. Such an implementation may provide improved performance in terms of interference. The transmitter modulator 172 may be implemented with a zero-IF architecture (for satellite applications) in order to use the PLL 174 from the input section 170. Such an approach has a number of advantages. For example, an incoming channel and a transmitted channel may be implemented using the same frequency. By using the same frequency, a reduction of the possible interference that may appear due to second and third order products with channels sitting at other frequencies is generally achieved.

Figure 4:
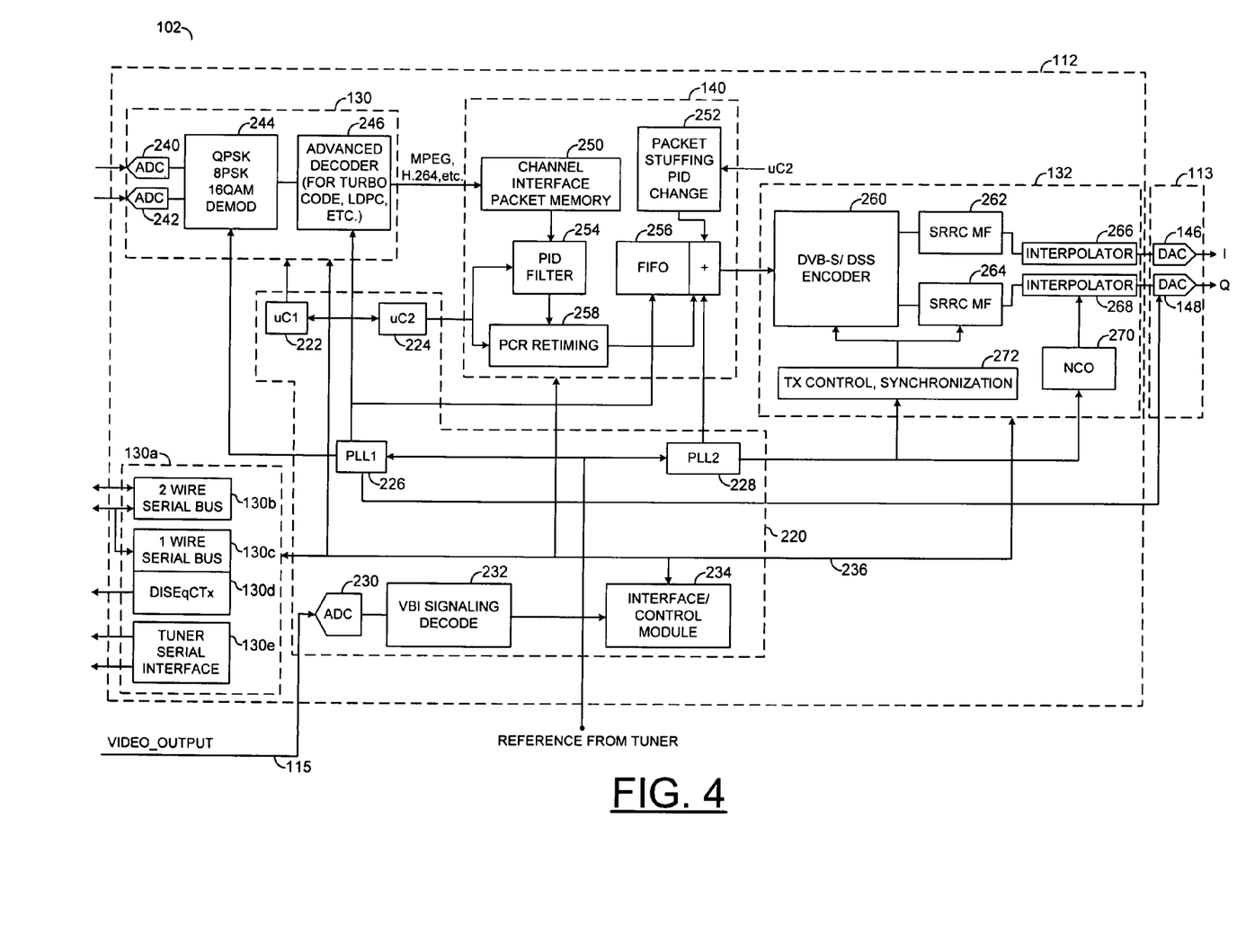
FIG. 4 is a more detailed diagram of the processing section of FIG. 2 illustrating an I/Q implementation output.

Referring to FIG. 4, a more detailed diagram of an example transmodulator circuit 112 is shown. The transmodulator circuit 112 generally maintains functionality for standalone receiver applications. The transmodulator 112 generally reduces throughput for a legacy rate (e.g., 20 MSps) transmission to the STB 104 for legacy box compatibility. The transmodulator 102 presents either a direct signal RF or a composite signal I and Q via an n-bit (e.g., 4-6 bit) DAC (or sigma-delta modulator). Communication may be established with the STB 104 via VBI signaling, MPEG layer and/or coax cable (13-18v) DC modulated with 22 KHz. While the circuit 102 of FIG. 4 generally illustrates the output circuit 113 having a DAC 146 and a DAC 148, the output circuit 113 may be implemented with a single DAC configured to present a signal IF as needed to meet the design criteria of a particular implementation.

The circuit 112 may comprise an additional auxiliary section (or circuit) 130a and a global control block (or circuit) 220. The circuit 130a generally comprises a bus interface 130b, a bus interface 130c, a transmit (Tx) circuit 130d and an interface 130e. The bus interface 130b may be implemented with a 2 wire serial bus. The bus interface 130c may be implemented with a one wire serial bus. The transmit circuit 130d may be DiSeQc compliant. The interface 130e may be implemented as a tuner/serial interface.

The circuit 220 generally comprises a block (or circuit) 222, a block (or circuit) 224, a block (or circuit) 226, a block (or circuit) 228, a block (or circuit) 230 and a block (or circuit) 232. The circuit 222 may be implemented as a microprocessor (or microcontroller). Similarly, the circuit 224 may also be implemented as a microprocessor (or microcontroller). The circuit 226 may be implemented as a PLL circuit. The circuit 228 may also be implemented as a PLL. The circuit 230 may be implemented as an analog to digital converter (ADC) circuit. The circuit 232 may comprise an extraction circuit. The circuit 232 may be implemented as a VBI signaling decoder circuit. The decoded information is passed to the interface/control module 234 which is connected to the circuit 130a, the circuit 130, the circuit 140, the circuit 132, the circuit 222 and the circuit 224 by a control bus.

Details of the circuit 130, the circuit 132 and the circuit 140 are also shown. In particular, the circuit 130 generally comprises a conversion circuit 240, a conversion circuit 242, a demodulation circuit 244 and a decoder circuit 246. The conversion circuits 240 and 242 may be implemented as analog to digital converter (ADC) circuits. The circuit 244 may be implemented as a QPSK/8PSK/16QAM/etc. demodulator. The circuit 246 may be implemented as a DVB-S2 or Turbo Code Decoder. However, other implementations may be used to meet the design criteria of a particular implementation. The circuit 130 may present a bitstream to the circuit 140. The bitstream may be compliant with one or more standards (e.g., MPEG, H.264, etc.).

The circuit 140 generally comprises a circuit 250, a circuit 252, a circuit 254, a circuit 256 and a circuit 258. The circuit 250 generally comprises a channel interface packet memory circuit. The circuit 254 generally comprises a packet stuffing PID change circuit. The circuit 254 generally comprises a PID filter circuit. The circuit 256 generally comprises a first-in first-out (FIFO) buffer. The circuit 258 generally comprises a PCR retiming circuit. The circuit 250 may be connected to the circuit 254. The circuit 252, the circuit 254, and the circuit 258 generally present signals to the circuit 256. The circuits 254 and 258 generally receive information from the circuit 224. The PLL circuit 226 may provide a clock signal to the circuit 256. The circuit 256 is generally coupled to the circuit 132.

The circuit 132 generally comprises a circuit 260, a circuit 262, a circuit 264, a circuit 266, a circuit 268, a circuit 270, and a circuit 272. The circuit 260 generally comprises a DVD-S/DSS (legacy) encoder. The circuit 262 generally comprises a square root raised cosine/matched filter (SRRC/MF) circuit. Similarly, the circuit 264 generally comprises a SRRC/MF circuit. The circuit 266 may be implemented as an interpolator circuit. Similarly, the circuit 268 may be implemented as an interpolator circuit. The circuit 270 may be implemented as a numerically controlled oscillator (NCO) circuit. The circuit 272 may be implemented as a transmit control and synchronization circuit. The interpolator 266 and the interpolator 268 present signals to the output circuit 113. The circuit 232 may be implemented with existing components and techniques similar to close captioning and teletext.

Figure 5:
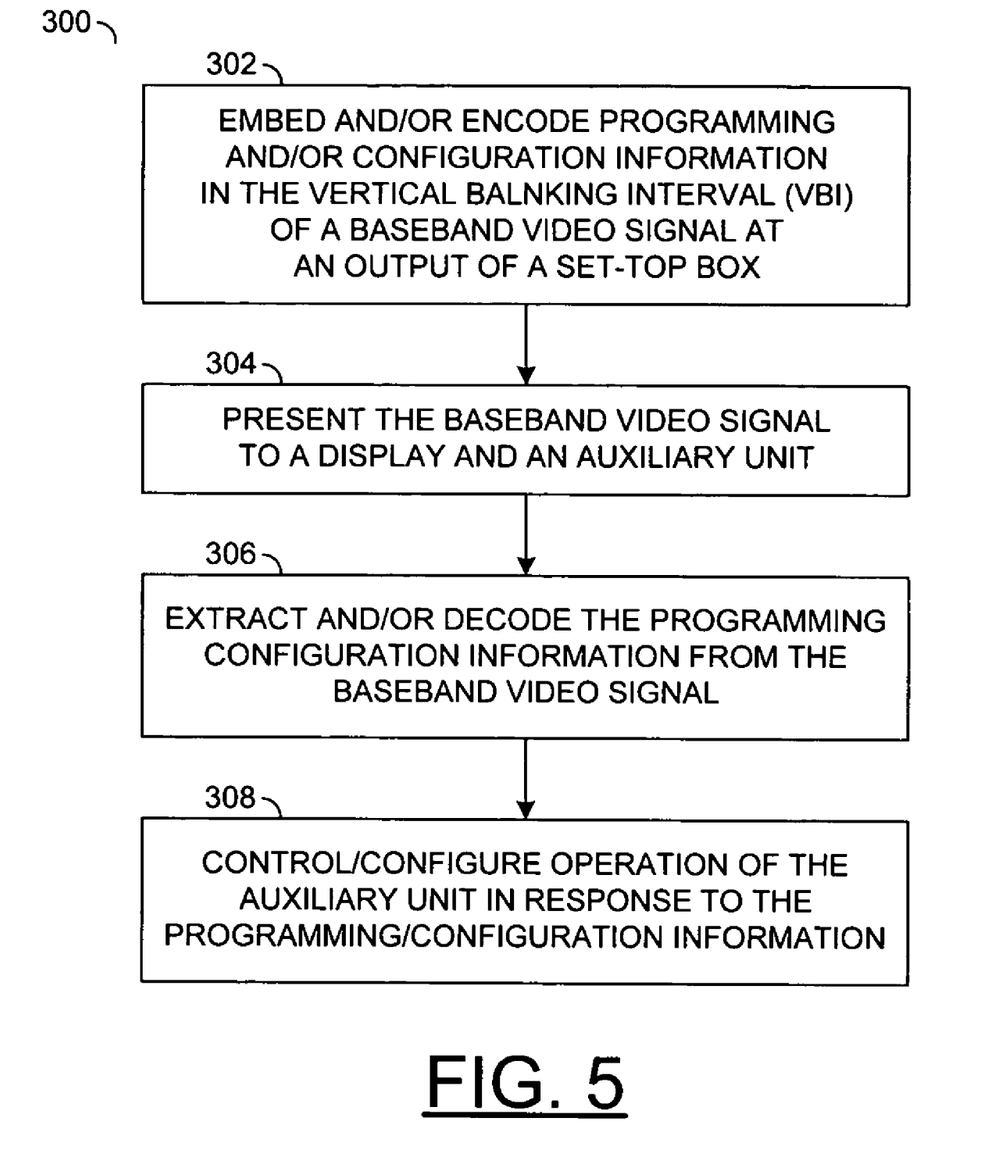
FIG. 5 is a flow diagram of a communication process in accordance with a preferred embodiment of the present invention.

Referring to FIG. 5, a flow diagram is shown illustrating a process 300 in accordance with a preferred embodiment of the present invention. The process 300 generally provides a method for baseband video signaling in a set-top box local loop connection. In a step 302, programming information for an auxiliary unit (e.g., a transmodulator unit) is generally embedded and/or encoded in, for example, the vertical blanking intervals of the baseband video output of a set-top box. In a step 304, the baseband video output of the set-top box is generally split and presented to (i) a display device and (ii) an input of the auxiliary unit. In a step 306, the programming information in the vertical blanking interval of the baseband video signal received from the set-top box is generally extracted and/or decoded by the auxiliary unit. In a step 308, the programming information controls (or configures) one or more operations (e.g., transmodulation of a satellite signal for presentation to the set-top box) of the auxiliary unit.

The system 100 may allow fast read back. For example, the demodulated signal is generally decoded to MPEG frames and made ready for re-encoding/re-modulation in the legacy format. Prior to encoding, the null packets in the stream are detected and loaded with the register map of the whole module. The PID of the packet is changed in order to make the packet recognizable at the output of the STB 104.

The system 100 may use an integrated Zero IF receiver with a Zero IF transmitter. The system 100 may implement a single PLL when an output channel is at a frequency similar to, or at a harmonic (e.g., x2, x3, x4, etc.) of, a frequency of an input channel. One or more transmit channels (e.g., Tx) may have Gain Control for matching the input channel power (to lower input/output crosstalk).

The circuit 100 may present a number of RF issues that may be resolved. For example, crosstalk may arise from a signal RF_IN on an interface 191 to a signal RF_OUT on an interface 193. One approach to reduce distortion is to implement the Zero-IF Tx on the same channel and at the same frequency as the input channel. Such an implementation can share the same VCO and does not generate in-band high order products with incoming signals. A transmit automatic gain control (AGC) may be implemented to track incoming desired channel and maintain a desired power difference in between the received and the transmitted channels. The transmit signals Tx on the interface 193 may be transmitted at lower power to reduce the crosstalk to the signal RF_INPUT. The transmit signals Tx may tolerate a certain amount of distortion since no other significant source of noise is present when the channel between the circuit 202 and STB 204 is implemented with a short connection. The minimum acceptable power level for the STB (e.g., in the range of −65 dBm) at RF_OUT may be acceptable at all times.

The present invention has been described in the context of an interface box. However, the present invention may be implemented anywhere in the data path before a legacy STB. For example, the present invention may be implemented in an expansion slot of the STB. In another example, the present invention may be implemented in a multi-dish switch between the STB and the satellite LNBs. Furthermore, the present invention may include an RF loop bypass that passes the incoming signal directly.

While the invention has been particularly shown and described with reference to the preferred embodiments thereof, it will be understood by those skilled in the art that various changes in form and details may be made without departing from the spirit and scope of the invention. For example, while the present invention has been described in connection with a satellite system, the present invention may easily be implemented in other architectures and applications such as cable and terrestrial STBs.

The invention claimed is:

1. An apparatus comprising:
    a transmodulator unit comprising (i) a first input configured to receive a baseband video signal, (ii) a second input configured to receive a first encoded data signal and (iii) an output configured to present a second encoded data signal to a legacy receiver, wherein (i) said second encoded data signal is generated in response to both said first encoded data signal and said baseband video signal, (ii) said first encoded data signal comprises an advanced data signal that is not compliant with said legacy receiver, (iii) said second encoded data signal comprises said first encoded data signal converted to a legacy data signal that is compliant with said legacy receiver, and (iv) said baseband video signal comprises information generated by said legacy receiver and said information is used to program said transmodulator unit to convert said first encoded data signal to said second encoded data signal.

2. The apparatus according to claim 1, wherein (i) said baseband video signal comprises embedded programming information and (ii) one or more operations of said transmodulator unit are controlled in response to said embedded programming information.

3. The apparatus according to claim 2, further comprising:
    a set-top box configured (i) to generate said baseband video signal in response to said second encoded data signal and (ii) to embed said programming information in said baseband video signal.

4. The apparatus according to claim 3, further comprising:
    a splitter comprising (i) an input port coupled to said set-top box, (ii) a first output port coupled to said transmodulator unit and (iii) a second output port coupled to a video device.

5. The apparatus according to claim 2, wherein said programming information is embedded in a vertical blanking interval of said baseband video signal.

6. The apparatus according to claim 2, wherein said transmodulator unit further comprises:
    a conversion circuit configured to convert said baseband video signal from an analog form to a digital form; and
    an extraction circuit configured to (i) extract said embedded programming information from said digital form of said baseband video signal, or (ii) extract said embedded programming information from said digital form of said baseband video signal and decode said embedded programming information.

7. The apparatus according to claim 3, wherein said transmodulation unit is configured to communicate with said set-top box using MPEG signal elements that do not contain information of a program to be displayed.

8. The apparatus according to claim 1, wherein:
said first encoded data signal comprises at least one of (i) an MPEG4 signal and (ii) a digital data signal; and
said second encoded data signal comprises at least one of (i) a MPEG2 signal and a MPEG signal.

9. The apparatus according to claim 1, wherein said transmodulator unit is implemented as a single integrated circuit.

10. The apparatus according to claim 1, wherein said second input of said transmodulator unit is further configured to connect to at least one of (i) a low noise block (LNB) of a satellite dish or other antenna, (ii) an over the air (OTA) antenna and (iii) a cable television signal.

11. The apparatus according to claim 1, wherein said advanced data signal comprises at least one of (i) an 8PSK, 16QAM or similar digitally modulated signal and (ii) a Turbo, LDPC (low density parity check) or other similar coded signal.

12. A transmodulator unit configured to support baseband video signaling in a set-top box local loop connection comprising:
means for receiving a baseband video signal comprising programming information embedded in at least one of a vertical blanking interval and a chroma portion of said baseband video signal, wherein said programming information is generated by a legacy receiver; and
means for controlling said transmodulator unit to convert a first encoded data signal that is not compliant with said legacy receiver to a second encoded data signal that is compliant with said legacy receiver, wherein said transmodulator unit converts said first encoded data signal to said second encoded data signal in response to both said first encoded data signal and said programming information embedded in said baseband video signal.

13. A method for baseband video signaling in a set-top box local loop connection comprising the steps of:
(A) receiving a baseband video signal comprising embedded programming information, wherein said programming information is generated by a legacy receiver; and
(B) controlling a transmodulator unit in response to both a first encoded data signal and said embedded programming information to convert said first encoded data signal that is not compliant with said legacy receiver to a second encoded data signal that is compliant with said legacy receiver.

14. The method according to claim 13, wherein said embedded programming information is encoded.

15. The method according to claim 13, wherein said programming information is embedded in said baseband video signal in a set-top box connected to said transmodulator unit.

16. The method according to claim 15, further comprising the steps of:
coupling said set-top box to an input port of a splitter;
coupling said transmodulator unit to a first output port of said splitter; and
coupling a display device to a second port of said splitter.

17. The method according to claim 13, wherein said programming information is embedded in a vertical blanking interval of said baseband video signal.

18. The method according to claim 13, further comprising the steps of:
converting said baseband video signal from an analog form to a digital form; and
extracting said embedded information from said digital form of said baseband video signal.

19. The method according to claim 18, further comprising the step of:
decoding said embedded programming information.

20. The method according to claim 16, further comprising the step of:
embedding said programming information in said baseband video signal such that display of said baseband video signal on said display is unaffected.

21. The method according to claim 15, wherein the step (B) comprises:
controlling transmodulation of a video signal from an advanced format to a legacy format compliant with said set-top box.

22. The apparatus according to claim 1, further comprising:
a local loop connection between said legacy receiver and said transmodulator unit, wherein said transmodulator unit is able to convert said first encoded data signal into said second encoded data signal only after said transmodulator receives said information in said baseband video signal.

* * * * *